United States Patent [19]
Geller

[11] 3,868,503
[45] Feb. 25, 1975

[54] MONOCHROMATIC DETECTOR

[75] Inventor: Myer Geller, San Diego, Calif.

[73] Assignee: The United States of America as represented by the Secretary of the Navy, Washington, D.C.

[22] Filed: Apr. 26, 1973

[21] Appl. No.: 354,716

[52] U.S. Cl. .......................... 250/213 R, 250/211 R
[51] Int. Cl. .......................... H01j 31/50
[58] Field of Search ............. 250/211 R, 211 J, 213, 250/207; 317/235 N; 313/103; 350/313, 314, 316

[56] References Cited

UNITED STATES PATENTS

| | | | |
|---|---|---|---|
| 3,348,074 | 10/1967 | Diemer | 250/211 R |
| 3,435,236 | 3/1969 | Love | 250/211 J |
| 3,443,102 | 5/1969 | Kaye | 250/211 J |
| 3,478,213 | 11/1969 | Simon | 250/207 |
| 3,478,214 | 11/1969 | Dillman | 250/211 J |
| 3,611,069 | 10/1971 | Galginaitis | 317/235 N |
| 3,675,026 | 7/1972 | Woodall | 317/235 N |

*Primary Examiner*—James W. Lawrence
*Assistant Examiner*—D. C. Nelms
*Attorney, Agent, or Firm*—R. S. Sciascia; G. J. Rubens; J. W. McLaren

[57] ABSTRACT

A layer of non-thermal, photo-responsive material is positioned to receive radiant energy to be detected, the photo-responsive material preferably having a very sharply defined cut-off sensitivity relative to wavelength. A second layer comprising insulating semiconductor material, chosen to have a very sharply defined turn-on transmissivity characteristic relative to wavelength, is positioned to intercept the radiant energy to be detected before its reception by the photo-responsive material. By selection of materials and predetermination of thickness of the layers, a sharply defined and narrow bandpass of detector response can be realized comprising substantially monochromatic wavelengths between the cut-off sensitivity characteristic of the photo-responsive material and the turn-on transmissivity characteristic of the semiconductor material.

6 Claims, 10 Drawing Figures

PATENTED FEB 25 1975 3,868,503

SHEET 1 OF 5

MONOCHROMATIC DETECTOR

BACKGROUND OF THE INVENTION

Many requirements exist for what are known as "monochromatic" detectors, i.e., a radiation responsive detector which is sensitive essentially to only a very narrow spectral region of wavelengths which for practical purposes may be considered virtually of a single color.

Such requirements may be developed in optical systems including those employed for communications, ranging, viewing, surveillance, etc. In such systems it is often desirable and necessary to detect radiation within a relatively very narrow wavelength region in the presence of background radiation which may extend over and beyond the complete spectrum of sensitivity of the detector. Frequently, such unwanted background radiation has "noise" components which make the accurate and reliable detection of radiation within the desired very narrow wavelength region difficult or sometimes practically impossible.

One common and conventional solution to the problem which has been customarily practiced in the past, is the use of an interference filter to intercept the radiation before its reception by the photo-responsive detector material to limit the extent of the exposure of the photo-responsive material to the unwanted background wavelengths of radiation. It is, of course, desirable to limit the passband of such an interference filter to a sharply defined cut-off region so as to eliminate, insofar as possible, all the unwanted and undesirable background radiation which exists at wavelengths beyond the cut-off region. Unfortunately, however, in many instances such results are most difficult to accomplish by the use of an interference filter because, by its inherent nature, the operative transmissivity of an interference filter is, at least in part, dependent upon the angle of incidence of the radiation which it receives and intercepts. Thus, when unwanted background radiation is received by an interference filter at an angle other than normal to the principal plane of the interference filter, the effective passband of the interference filter is significantly increased. This undesirable effect is caused by the fact that radiation which is received at an angle other than normal to the principal plane of the filter, develops phase relationships which do not provide total, nor nearly total cancellation of the radiant energy and the interference phenomenon is therefore relatively ineffective to provide sufficient attenuation of much unwanted and undesirable background radiation before it reaches the photo-responsive detection means.

One expedient which may be employed to reduce and control the unwanted effect which occurs by reason of radiation impinging upon the interference filter at an angle other than normal to the principal plane of the filter, is to restrict the aperture of the filter so that only that radiation emanating from predetermined angles is accepted. This expedient, however, significantly diminishes the sensitivity of response of the photo-responsive material with which the filter is employed because such sensitivity usually depends to a significant degree upon a large field of view in order to provide a desired response to signals of relatively small amplitude. On the other hand, a large field of view will necessarily involve the acceptance of radiation at angles of incidence other than normal to the principal plane of the filter, with a resultant increase in the noise, causing a commensurate decrease in the desired performance of the system.

Accordingly, it is highly desirable that an improved monochromatic detector be devised that will provide an enhanced response to radiation within relatively very narrow wavelength regions which can be precalculated and predetermined to a desired degree.

SUMMARY OF THE INVENTION

The present invention contemplates an essentially monochromatic detector for responding to wavelengths of radiation within a narrow spectral region with a greater degree of sensitivity and reliability than has heretofore been possible with prior art detectors having comparable functional objectives. Moreover, the concept and teaching of the present invention provides a monochromatic detector sensitivity which may be limited to a preselected and predetermined narrow wavelength spectral region and additionally possesses the highly desirable operative characteristic of having a response that is independent of the angle of incidence of the received radiation which it is designed to detect.

In accordance with the concept of the present invention, a non-thermal, photo-responsive material (including semiconductor types of materials) selected to have a suitably sharp cut-off sensitivity relative to the wavelengths of the radiation it receives, is positioned to receive the radiant energy to be detected. A layer of insulating, semiconductor material having an acceptably sharp turn-on transmissivity characteristic relative to wavelength, is then positioned to intercept the radiation to be detected before its reception by the previously described photo-responsive material.

The sharp cut-off sensitivity relative to wavelength which is characteristic of the photo-responsive material, defines the upper wavelength limit of the responsivity of the monochromatic detector, while the sharp turn-on transmissivity characteristic relative to wavelength which distinguishes the insulating semiconductor material, defines the lower wavelength limit of the response of the monochromatic detector, encompassing therebetween a narrow bandpass of monochromatic wavelengths which it is desired to detect.

A broad range of monochromatic spectral regions can be predetermined by suitable choices of non-thermal, photo-responsive materials employed in conjunction with appropriately chosen insulating semiconductor materials.

Moreover, by predetermination and precalculation of the thickness of the layers of the two materials, the degree of sharpness of the turn-on and turn-off characteristics may both be pre-established to meet specific detector requirements as desired.

Accordingly, it is a primary object of the present invention to provide a monochromatic detector possessing improved response characteristics as contrasted to detectors of the prior art having comparable operative objectives.

Yet another most important object of the present invention is to provide such an improved monochromatic detector which possesses sharp turn-on and turn-off characteristics so that its response to received radiation of wavelengths outside the desired monochromatic spectral region is minimal.

A further important object of the present invention is to provide such a monochromatic detector which exhibits responsive characteristics that are essentially independent of the angle of incidence of received radiation.

Another object of the present invention is to provide such a monochromatic detector in which the region of monochromatic spectral response may be determined by choice of suitable combinations of materials as employed for both photo-response and filtering purposes.

A further most important object of the present invention is to provide a monochromatic detector in which the nature of the materials employed for both filtering and photo-response is such that the respective thicknesses may be precalculated and predetermined to give effect to desired degrees of sharpness of the turn-on transmissivity characteristic as well as the turn-off sensitivity.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

In accordance with the concept and teaching of the present invention, a film or layer of non-thermal photo-responsive material, selected for having sharp cut-off sensitivity relative to wavelength, is combined with a film or layer of insulating semiconductor material having a sharp turn-on transmissivity characteristic relative to wavelength, so as to define a narrow bandpass of substantially monochromatic wavelengths where the detector is responsive to radiation.

The term "non-thermal," is used to characterize the type of photo-responsive detector material employed as conceived and taught by the present invention, which does not depend upon a heating effect for its operative response characteristics. The term "insulating" semiconductor is used to identify semiconducting materials whose resistivity is closer to that of an insulator than that of a metal.

Figure 1B:
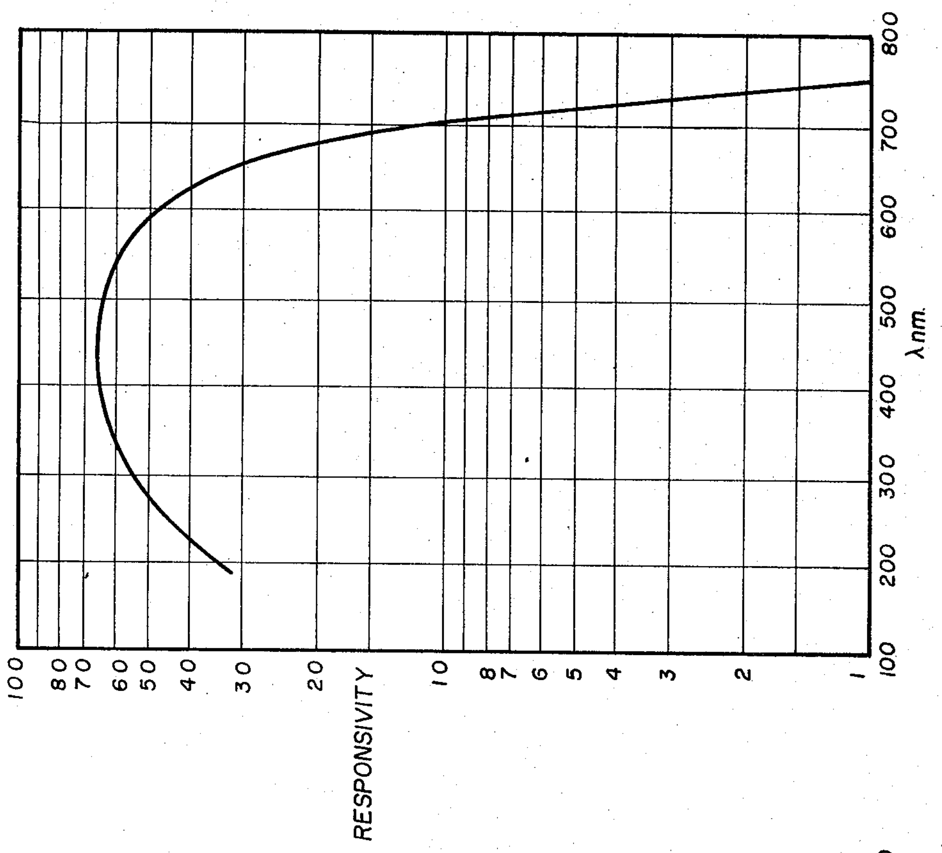
FIGS. 1*a* and 1*b* are graphic illustrations of the characteristic response of two different non-thermal, photo-responsive materials.
Figure 1A:
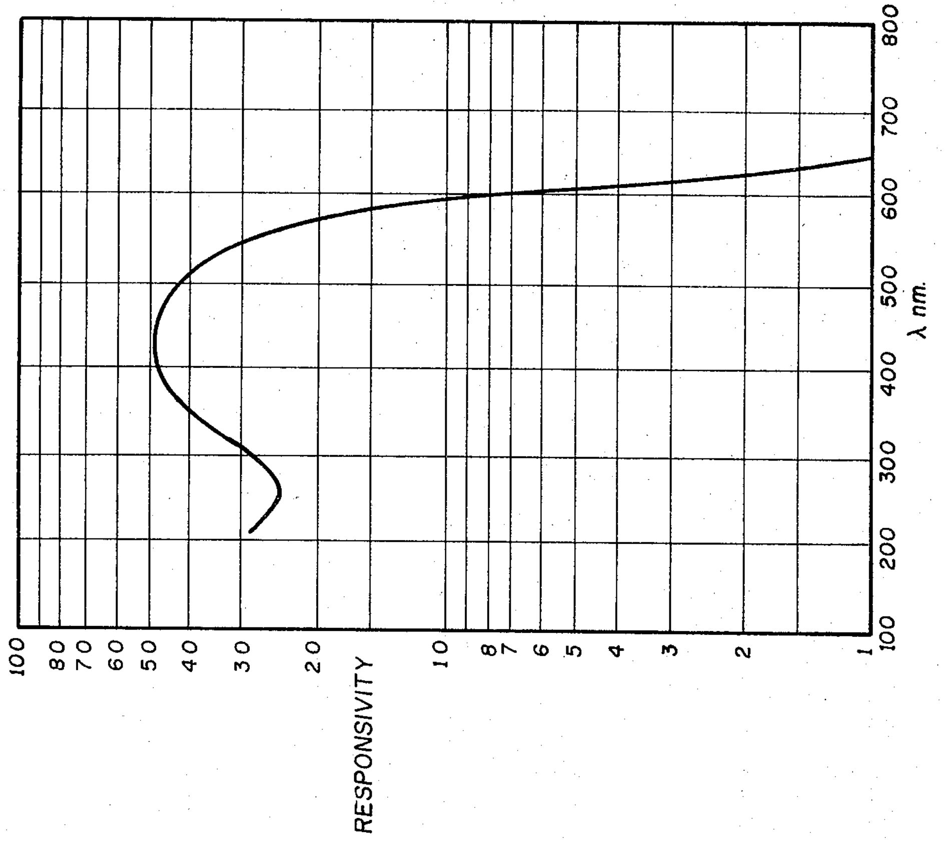

One such typical non-thermal, photo-responsive material is conventionally and commonly known as S–13 and its responsive characteristics relative to wavelength, as illustrated in FIG. 1a, are those given in the *RCA Electro-Optics Handbook*, published 1968. It will be seen by reference to FIG. 1a that the S–13 photo-responsive material has a comparatively very sharp cut-off sensitivity illustrated in terms of milliamperes per one-tenth watt shown on a log scale, as contrasted to the lineal scale of the abscissa scale showing wavelength.

FIG. 1*b* illustrates the spectral response characteristics of another photo-responsive material known as "135, 129 GaAs P" as illustrated in the *RCA Photomultiplier Manual*, published 1970. The non-thermal, photo-responsive material whose characteristic is illustrated in FIG. 1*b* similarly exhibits a very sharp-cut-off sensitivity relative to wavelength but, its sharpest cut-off of sensitivity ranges in the 700 to 800 nanometer region in contrast with the 550 to 650 nanometer region where the sharpest cut-off in sensitivity lies for the material whose characteristic is illustrated in FIG. 1*a*.

FIGS. 1a and 1b illustrate the characteristics of photo-responsive materials which may be categorized as primarily "photo-emissive" in character. However, within the concept of the present invention any suitable photo-responsive material may be chosen, depending upon the desired operative range contemplated for the detector. For instance, the photo-responsive properties of the insulating semiconductor, gold doped germanium, may be used to generate appropriate response of a detector embodying the present invention.

Figure 2:
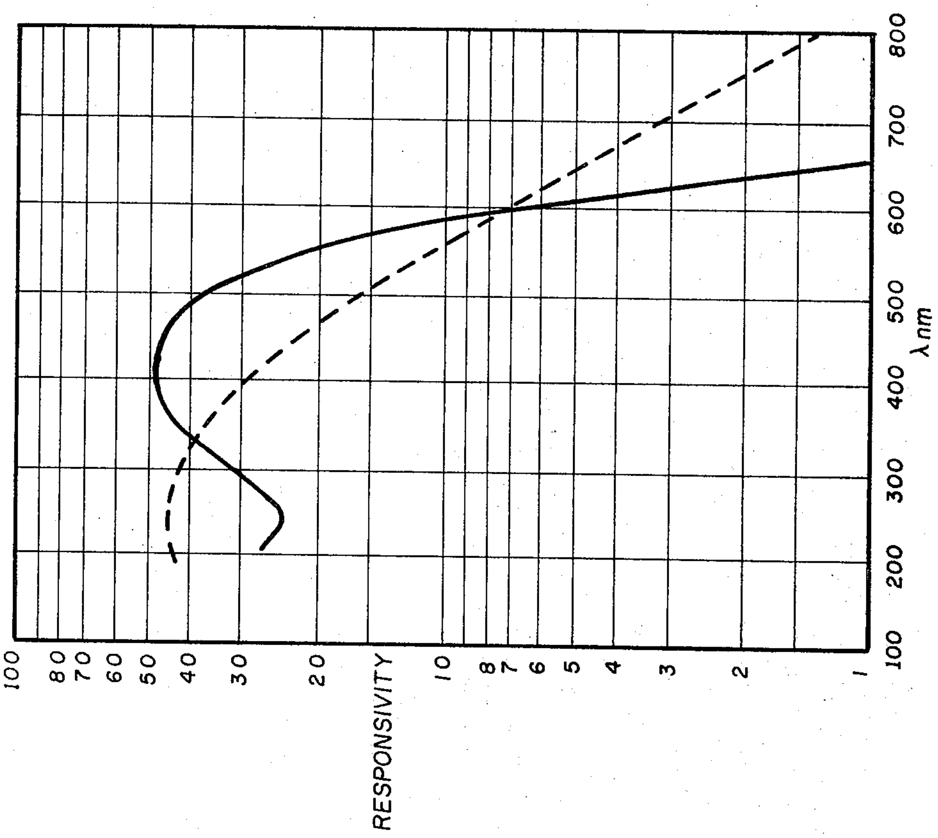
FIG. 2 is a graphic illustration of the manner in which the response of a selected non-thermal, photo-responsive material varies in accordance with its thickness.

FIG. 2 illustrates how the sharpness of cut-off sensitivity may be altered and predetermined by varying the thickness of the film or layer of non-thermal photo-responsive material. The dash lines shown in FIG. 2 illustrate the typical response of a photo-responsive material in a relatively thin film or layer. The solid line characteristic shown in FIG. 2 illustrates the sharpness of cut-off sensitivity relative to wavelength which can be realized by providing a thicker film or layer of the same photo-responsive material, achieving a sharp cut-off of sensitivity in approximately the 550 to 650 nanometer region.

Figure 3:
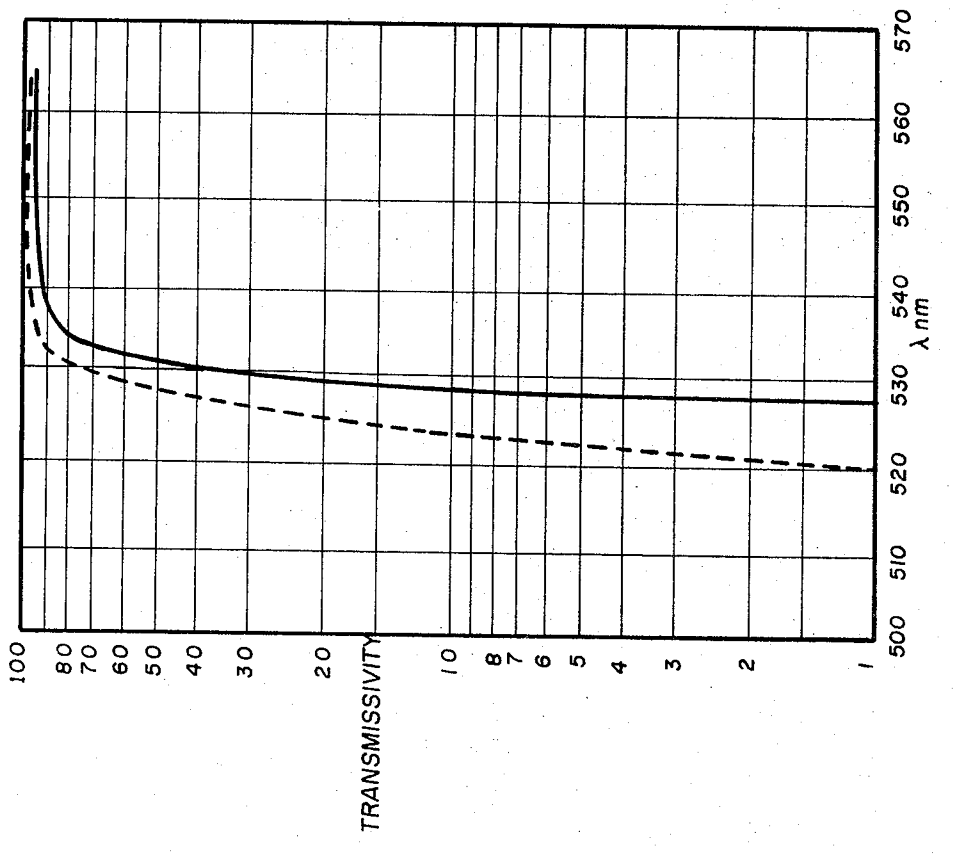
FIG. 3 is a graphic illustration of how the transmissivity of an insulating semiconductor material varies with its thickness.

FIG. 3 illustrates the transmissivity characteristics relative to wavelength of a typical insulating semiconductor material such as CdS. The dash line characteristic illustrates a relatively very gradual turn-off transmissivity characteristic which is typical of a comparatively thin film or layer of the insulating semiconductor material CdS, whereas the solid line characteristic illustrates a sharply defined turn-off transmissivity characteristic which is typical of a thicker film or layer of the same material.

In accordance with the concept of the present invention, when the spectral region of interest has been determined, the detector's response is established, in part, by the selection of an appropriate non-thermal, photo-responsive material which defines the upper limits of the detector's response relative to wavelength. The detector is fabricated with a sufficient thickness of film or layer of non-thermal, photo-responsive material to provide a desirably sharp cut-off of its sensitivity relative to wavelength at the upper limits of detection.

Then, an appropriate insulating semiconductor material is selected in accordance with the lower limits of the desired spectral response of the detector. The selected semiconductor material is employed in a sufficient thickness of film or layer to provide the requisite degree of sharpness of its turn-on transmissivity characteristic relative to wavelength as is illustrated in FIG. 3.

The semiconductor material is coactively employed to carry out the concept and teaching of the present invention by being positioned so as to intercept the radiation to be detected before it reaches the selected non-thermal photo-responsive material.

Figure 4:
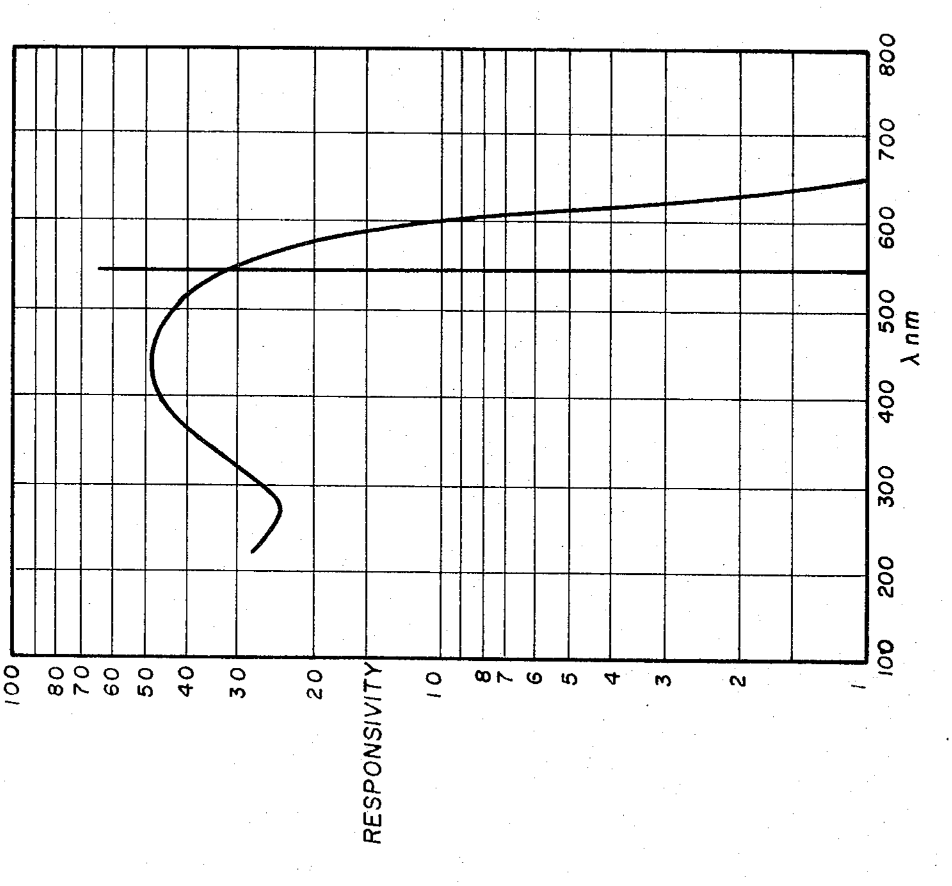

The resultant operative characteristics of such a combination are illustrated in FIG. 4 where the response of a detector embodying the teaching and concept of the present invention is seen to be almost entirely and wholly limited to radiation in the approximate wavelength region of 550 nanometers to 650 nanometers. The embodiment whose characteristics are illustrated in FIG. 1 combines the S–13 photo-responsive material with the insulating semiconductor CdS.

Figure 5:
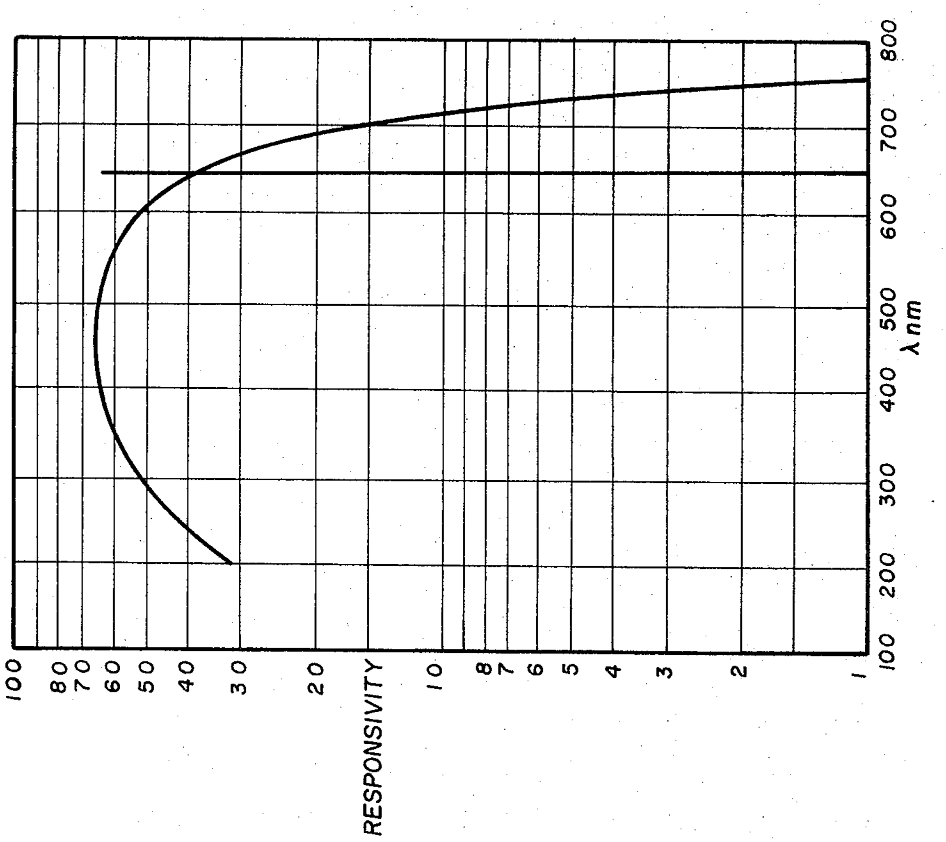
FIGS. 4 and 5 illustrate the spectral response characteristics of two different embodiments of the present invention.

Response characteristics of another embodiment of the present invention are illustrated in FIG. 5 wherein a non-thermal, photo-responsive material, described as "135, 129 GaAsP" in the previously referenced *RCA Photomultiplier Manual*, is combined with the insulating semiconductor material CdSe to produce a narrow bandpass of spectral response lying approximately in the 670 to 750 nanometer region.

It should be borne in mind that FIGS. 1*a* and 1*b*, 2, 3, 4, and 5 are shown on a log scale with respect to both responsivity and transmissivity. Accordingly, perhaps a more realistic appreciation of the sharpness of the narrow band spectral response as it actually is may be had from an illustration of the response characteristic of an embodiment of the present invention on a lineal scale.

Figure 6:
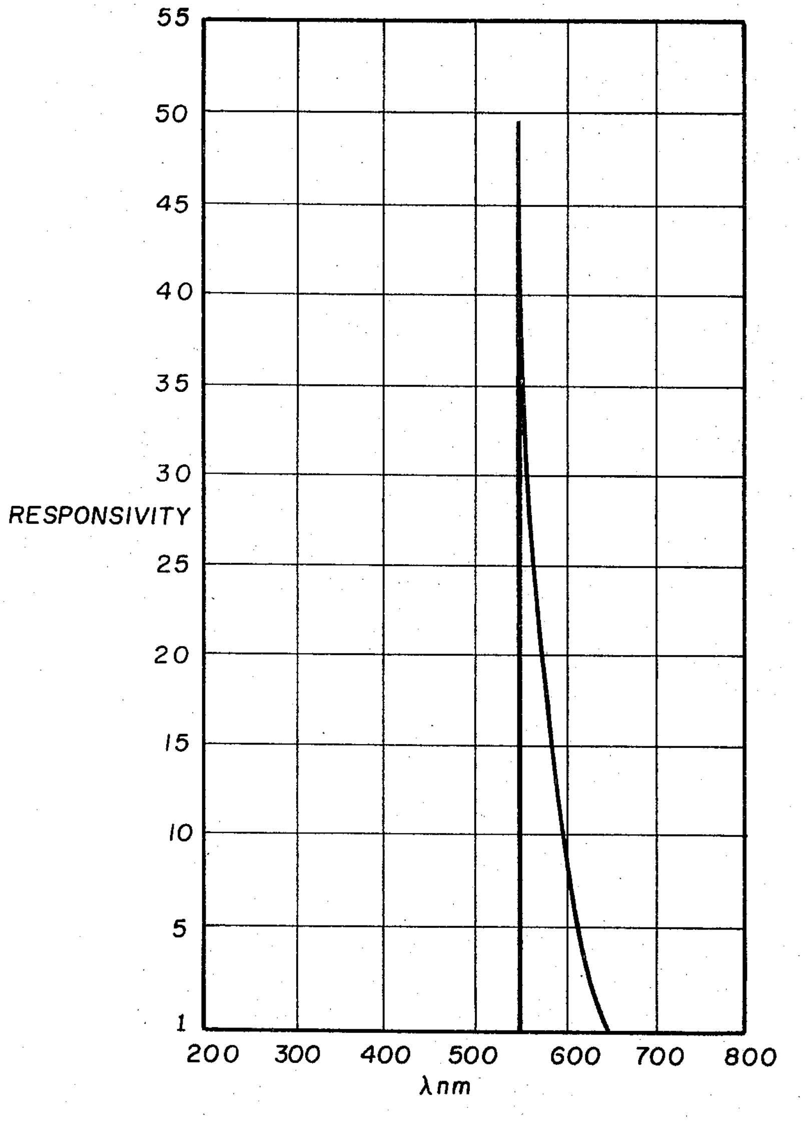
FIG. 6 illustrates the spectral response of an embodiment of the present invention on a lineal scale.

FIG. 6 illustrates the spectral response characteristic of the same embodiment of the present invention as shown in FIG. 4; however, the ordinate which is shown in log scale in FIG. 4 vs. a lineal abscissa scale, has been converted in FIG. 6 to a lineal ordinate scale vs. the same lineal abscissa scale of FIG. 4. Accordingly, it can readily be appreciated that the concept and teaching of the present invention provides an extremely sharply defined response in an essentially monochromatic detector which could not be achieved by the expedient of conventional, older practices such as use of interference filters to define the turn-on transmissivity characteristic of a prior art detector.

Figure 7:
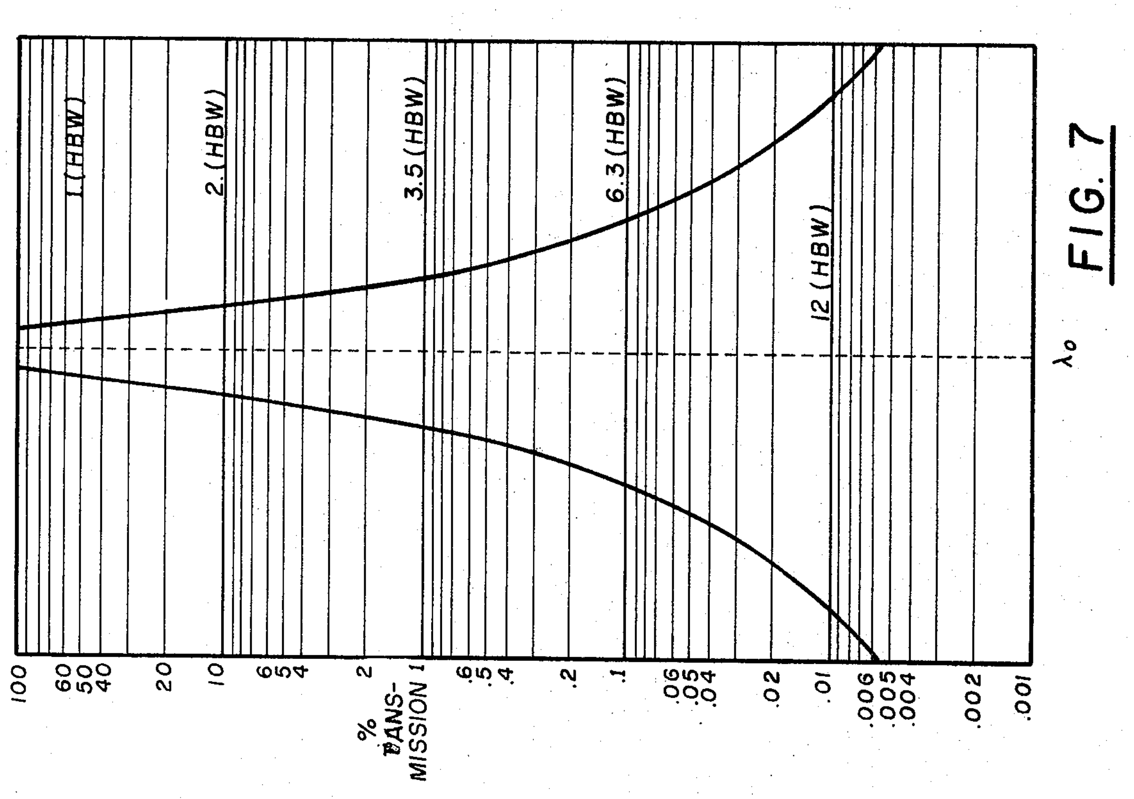
FIG. 7 illustrates the transmission characteristics of an interference filter.

The superior operative characteristics provided by the concept and teaching of the present invention are evident by reference to FIG. 7 which depicts the typical transmissivity characteristic of a double interference filter such as may be used with photo-responsive materials to limit by attenuation those wavelengths of radiation which reach the photo-responsive material and thus commensurately limit its response. The characteristic interference filter attenuation shown in terms of percent transmission vs. half bandwidth (HBW) in FIG. 7 is representative of double filters which are currently commercially available for filtering out all but a relatively narrow band of wavelengths at center frequencies which may be chosen over a range of approximately 4,200A to 3,500A.

The characteristic illustrated in FIG. 7 applies to each of the double filters listed in Table I below, which may be chosen for the most desirable HBW (half bandwidth) in terms of the center wavelengths $\lambda_o$ as shown in the left hand column.

| HBW | Min. % T | ..Blocking | $\lambda_o$ Shift 10° | $\lambda_o$ Shift 20° |
|---|---|---|---|---|
| 0018 × $\lambda_o$ | 35% | ≦.01%T | 989 × $\lambda_o$ | 959 × $\lambda_o$ |
| 0026 × $\lambda_o$ | 37% | ≦.01%T | 987 × $\lambda_o$ | 952 × $\lambda_o$ |
| 0033 × $\lambda_o$ | 40% | ≦.01%T | 983 × $\lambda_o$ | 931 × $\lambda_o$ |
| 0045 × $\lambda_o$ | 45% | ≦.01%T | 964 × $\lambda_o$ | 936 × $\lambda_o$ |
| 0055 × $\lambda_o$ | 50% | ≦.01%T | 989 × $\lambda_o$ | 959 × $\lambda_o$ |
| 0080 × $\lambda_o$ | 50% | ≦.01%T | 987 × $\lambda_o$ | 952 × $\lambda_o$ |
| 0097 × $\lambda_o$ | 50% | ≦.01%T | 983 × $\lambda_o$ | 931 × $\lambda_o$ |
| 014 × $\lambda_o$ | 50% | ≦.01%T | 984 × $\lambda_o$ | 936 × $\lambda_o$ |

It should be carefully noted and appreciated, however, that the operation of such filters, in accordance with the characteristic illustrated, is absolutely dependent upon the received radiation being incident upon the filter at an angle which is normal to the principal plane of the filter. Such radiation as may be received at angles which deviate from the normal to the principal plane of the filter does not undergo the same interference changes and therefore an appreciable amount of such radiation is permitted to pass through the filter in an uncancelled or partially uncancelled condition. Moreover, the design center wavelength $\lambda_o$, shifts as a function of the angle of incidence, as indicated in the fourth and fifth columns of Table I which give the wavelength shifts for 10° and 20° deviation, respectively, from the desired angle of incidence normal to the principal plane of the filter. As a result, such interference filters do not entirely accomplish the full desired result of permitting only the transmission of certain and predeterminable wavelengths of radiation since the transmission of radiation by an interference filter depends in a very important sense upon the angle of incidence of such radiation upon the principal plane of the interference filter.

The concept and teaching of the present invention eliminates such problems as the angle of incidence at which radiation is received because the insulating semiconductor material as employed in the present invention intercepts the radiation before it reaches the secondary layer of photo-responsive material and such insulating semiconductor material exhibits a transmissivity characteristic which is entirely independent of the angle of incidence at which radiation is received by it.

As has been previously explained and illustrated, the degree of sharpness of the turn-on transmissivity characteristic of insulating semiconductor material employed in accordance with the concept of the present invention may be precalculated and predetermined by varying the thickness of the film or layer of such insulating semiconductor material.

Moreover, the transmission characteristic of a semiconductor material may be selectively shifted towards the longer or shorter wavelengths of visible radiation, for example, by the choice of an appropriate mixture; for instance, a mixture with Zn*S* shifts the turn-on characteristic of CdS towards shorter wavelengths, while a mixture with CdSe shifts the CdS characteristic towards longer wavelengths.

Additionally, it is evident from the typical transmissivity characteristic of a double interference filter as shown in FIG. 7, that some radiation of wavelenths considerably outside the nominal bandwidth will be transmitted by that filter. This is apparent from the manner in which the typical characteristic illustrated by FIG. 7 displays a very definite flare at its lower portion indicating the transmission of wavelengths of radiation over an increasingly broader spectral region, as the percentage of transmission diminishes.

This typical operation of interference filters has a most undesirable consequence, particularly when relatively weak radiation signals within a determined bandwidth must be detected in the presence of strong noise signals of wavelengths adjacent to that bandwith. The result is that enough of the stronger noise and extraneous radiation may be transmitted so that the photo-responsive element produces an output wherein the desired signal is obscured, at least partially, by the noise signal.

By contrast, the present invention provides that an extremely sharp cut-off can be achieved at both the upper and lower limits of the spectral region of interest, through the selection of the most appropriate materials from a broad choice of possibilities, principally within the semiconductor categories, and also by predetermination of the optical thicknesses of the films or layers of such materials to produce the desired sharpness of cut-off at the limits of the spectral region of interest.

Figure 8:
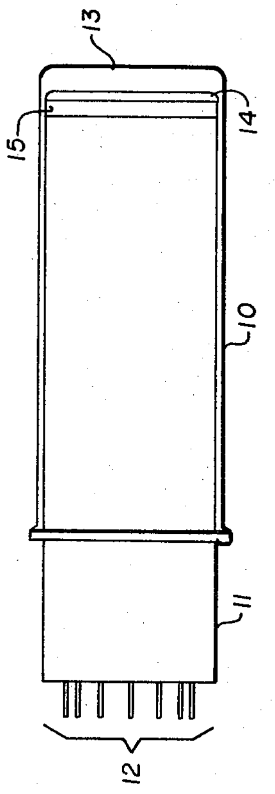
FIGS. 8 and 9 illustrate embodiments of the present invention in two different configurations.
Figure 9:
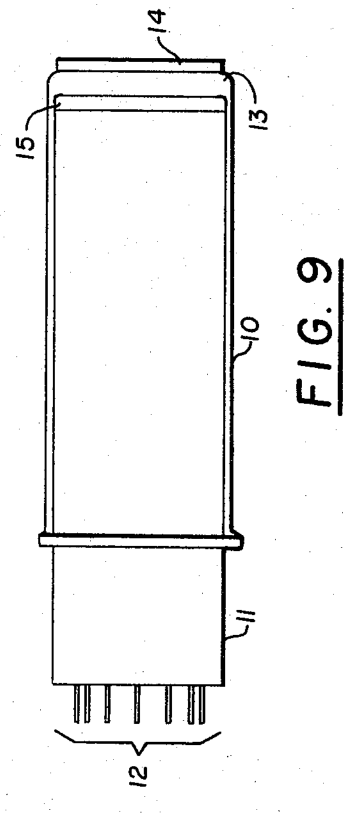

FIGS. 8 and 9 illustrate embodiments of the present invention which take a basic form similar to the configuration of photo-multiplier tubes such as are currently available commercially. As may be seen from FIG. 8, a sealed enclosure 10 is supported on a base 11 with suitable electrical contacts 12 brought out from the base 11 for connection in the operation of the device.

A window 13 forms part of the enclosure 10 and is chosen of an appropriate glass, quartz, or other suitable material to permit maximum transmission of the radiation wavelengths which it is desired to detect. A film or layer of insulating semiconductor material 14 is supported on the inside of the window 13 which functions as a substrate.

Overlaying the insulating semiconductor film or layer 14 is a second film or layer 15 supported thereon which comprises a photo-responsive material. Thus, the radiation which it is desired to detect within limited wavelengths is effectively filtered by the insulating semiconductor material 14 regardless of its angle of incidence thereon and those wavelengths which are transmitted through the insulating semiconductor material 14 impinge upon the non-thermal film or layer of photo-responsive material 15 to generate an appropriate output. The output may then be multiplied and amplified in a conventional manner within the enclosure 10 by a suitable photomultiplier structure (not shown).

In a similar manner, FIG. 9 illustrates an embodiment of the present invention which also takes a form essentially similar to a photomultiplier device, but with a different arrangement of the co-acting films or layers of selected materials as conceived and taught by the present invention. In FIG. 9 the window 13 is interposed between the insulating semiconductor film or layer 14 which is shown on the outside of the assembly and the photo-responsive film or layer 15 which is illustrated as being supported on the inside of the window 13. Therefore the two films or layers are supported on the same substrate in the form of the window 13, but on opposite sides.

As in the embodiment illustrated in FIG. 8, the embodiment of FIG. 9 similarly operates so that the film or layer of insulating semiconductor material 14 is positioned to initially intercept the radiation which it is desired to detect, permitting only the transmission of predetermined and preselected wavelengths within a narrow spectral region. Such transmitted radiation then passes through the window 14 and impinges upon the photo-responsive material 15 to generate a commensurate output as previously described. The output thus generated may then be multiplied or amplified in an essentially conventional manner by a suitable structure within the photomultiplier assembly. Those knowledgeable and skilled in the art will appreciate the very significant advantages and improvements of the concept and teaching of the present invention from the foregoing description which not only illustrates its numerable, desirable aspects but also the ease and facility with which the concept of the present invention may be implemented as for instance, in a photomultiplier type or similar configuration of device.

Obviously many modifications and variations of the present invention are possible in the light of the above teachings. It is therefore to be understood that within the scope of the appended claims the invention may be practiced otherwise than as specifically described.

What is claimed is:

1. A monochromatic detector comprising:

a layer of non-thermal, photo-responsive material positioned to receive the radiant energy to be detected, said photo-responsive material having a sharp-cut-off sensitivity characterized by rapidly decreasing response to light energy relative to wavelength at the upper limit of a preselected spectral region; and a layer of insulating semiconductor material positioned to intercept said radiant energy before its reception by said photo-responsive material, said semiconductor material having a sharp turn-on transmissivity characterized by rapidly increasing transmission of light energy relative to wavelength at the lower limit of said preselected spectral region, defining a narrow band pass of substantially monochromatic wavelengths between said cut-off sensitivity and said turn-on transmissivity of said preselected spectral region.

2. A monochromatic detector as claimed in claim 1 wherein said layer of photo-responsive material is a semiconductor.

3. A monochromatic detector as claimed in claim 1 wherein said layer of photo-responsive material is an operative element of a photomultiplier device.

4. A monochromatic detector as claimed in claim 1 wherein both said layers are supported on a common substrate.

5. A monochromatic detector as claimed in claim 1 wherein one of said layers overlays the other layer in direct contact.

6. A monochromatic detector as claimed in claim 1 wherein said layers are supported on opposite sides of a common substrate.

* * * * *